United States Patent [19]

Carter et al.

[11] Patent Number: 5,757,087
[45] Date of Patent: May 26, 1998

[54] OXIDATION OF URANIUM HEXAFLUORIDE

[75] Inventors: Robert Carter; John Terry Semeraz, both of Preston, United Kingdom

[73] Assignee: British Nuclear Fuels plc, Warrington

[21] Appl. No.: 592,369

[22] PCT Filed: May 30, 1995

[86] PCT No.: PCT/GB95/01234

§ 371 Date: Mar. 20, 1996

§ 102(e) Date: Mar. 20, 1996

[87] PCT Pub. No.: WO95/32921

PCT Pub. Date: Dec. 7, 1995

[30] Foreign Application Priority Data

May 28, 1994 [GB] United Kingdom ............... 9410782

[51] Int. Cl.$^6$ .............................................. C01G 43/00
[52] U.S. Cl. .......................... 423/253; 423/260; 423/261
[58] Field of Search ........................... 423/253, 260, 423/261

[56] References Cited

U.S. PATENT DOCUMENTS

| | | | |
|---|---|---|---|
| 3,790,493 | 2/1974 | Dada et al. | 423/261 |
| 3,969,477 | 7/1976 | Keith et al. | 423/261 |
| 3,970,581 | 7/1976 | Jeter et al. | 423/260 |
| 4,005,042 | 1/1977 | Dada | 423/260 |
| 4,031,029 | 6/1977 | Colter et al. | 423/260 |
| 4,090,976 | 5/1978 | DeHollander et al. | 423/261 |
| 4,112,055 | 9/1978 | Artaud | 423/261 |
| 4,397,824 | 8/1983 | Butler et al. | 423/260 |
| 4,698,214 | 10/1987 | Linz et al. | 423/260 |
| 4,803,056 | 2/1989 | Morris et al. | |
| 4,812,166 | 3/1989 | Saiki et al. | |

FOREIGN PATENT DOCUMENTS

| | | | |
|---|---|---|---|
| 0054530 | 6/1982 | European Pat. Off. | C01B 33/18 |
| 2064503 | 6/1981 | United Kingdom | C01G 43/01 |

*Primary Examiner*—Edward A. Miller
*Attorney, Agent, or Firm*—Sheridan Ross PC

[57] ABSTRACT

The present invention provides a process for the oxidation of uranium hexafluoride by injecting the uranium hexafluoride and an oxidant gas together into a reaction vessel to form a plume characterized in that a plurality of the said plumes are formed together in the same vessel, the plumes mutually contributing to a circulating product formation stream in the said vessel. The process may include the establishment of three or more plumes simultaneously contributing to the reaction between the gases in the reaction vessel. The oxidant gas may comprise steam. The process may be one in which the product is formed as a particulate solid. The product particles may initially be formed as dentritic particles which may be recirculated in the reaction vessel to promote seeding, growth, agglomeration and aggregation of the required product particles, the plumes thereby contributing to the product formation process in the vessel.

11 Claims, 2 Drawing Sheets

OXIDATION OF URANIUM HEXAFLUORIDE

FIELD OF THE INVENTION

The present invention relates to processes for the oxidation of uranium hexafluoride.

Around the world there is increasing interest in the Applicants' Integrated Dry Route (IDR) kiln process for the conversion of $UF_6$ into $UO_2$. Features of the process are the subject of prior patents GB 1341379 and GB 2064503. With customers in 10 countries already benefiting from licensed use of the IDR process, its reliability and its ability to produce several different nuclear fuel types are well known. Since its 1969 introduction to the Applicants' Springfields site the IDR process has been used in fabrication of fuel for use in for Light Water Reactors (LWR), Heavy Water Reactors (HWR) and Advanced Gas-cooled Reactors (AGR).

BACKGROUND OF THE INVENTION

What makes the IDR process remarkable is that it converts uranium hexafluoride into ceramic grade uranium dioxide in just one processing vessel. This is in contrast to other wet or dry routes, which can take up to six different processing stages in different vessels to achieve the same result. Consequently, the Applicants' IDR process is the most direct and economic conversion route.

In addition, the IDR process is very versatile. It produces an exceptionally pure uranium dioxide powder which can be used to meet the specific pellet requirements of the various fuel types required by different nuclear reactor systems. The powder can be used in fuels made with or without the addition of a binder, and the Applicants have also developed pore formers for the powder which allow the introduction of controlled porosity in sintered pellets, and the ability to control precisely the sintered density of the pellets produced.

The dry IDR process produces minimal effluents. Accordingly, the IDR process is well able to cope with increasingly stringent discharge limits and is eminently suitable for dealing with reprocessed uranium.

In the IDR process the gases to be reacted together, viz $UF_6$ and dry steam, are injected together as an aerosol plume into a reaction vessel as described for example in Applicants' GB 2135058B. The purpose of the present invention is to improve the product throughput of the UF6 oxidation process used in the IDR process whilst maintaining product quality.

SUMMARY OF THE INVENTION

According to the present invention there is provided a process for the oxidation of uranium hexafluoride by injecting the uranium hexafluoride and an oxidant gas together into a reaction vessel to form a plume characterised in that a plurality of the said plumes are formed together in the same vessel, the plumes mutually contributing to a circulating product formation stream in the said vessel.

The process may include the establishment of three or more plumes simultaneously contributing to the reaction between the gases in the reaction vessel.

The oxidant gas may comprise steam.

The process may be one in which the product is formed as a particulate solid as in the prior art. The product particles may initially be formed as dendritic particles which may be recirculated in the reaction vessel to promote seeding, growth, agglomeration and aggregation of the required product particles, the plumes thereby contributing to the product formation process in the vessel.

The reaction vessel may include an enclosure providing a region of excess volume which facilitates the recirculation process. Such a region per se is known in the prior art as in the IDR process where it is provided by a so-called disentrainment hopper.

A rotating mechanism such as a scroll structure also known per se in the prior art may be employed in the reaction vessel also to assist in the recirculation process as well as in the delivery of product particles to the outlet of the reaction vessel.

Where the reaction vessel includes an enclosure providing a region of excess volume at least one of the plumes may be established in the said region. Another of the plumes may be established in a part of the reaction vessel which is substantially level with the outlet region for the reaction product.

The said plumes may be formed by two reacting gases $UF_6$ and $H_2O$ although one or more further gases may take part in the reaction. The gases producing each plume may be delivered in a jet.

Where the plumes are formed by two gases one or more of them may be formed by a co-axial tubular jet or nozzle. One of the reacting gases may be fed along the inner channel of each such jet and the other of the reacting gases may be fed along the outer channel of each such jet. Alternatively, one or more of the plumes may be formed by a multiple jet having gas delivery tubes which are side-by-side or one above the other.

The solid produced by the process according to the present invention may be passed to another reaction chamber which may be part of the same vessel or another separate vessel.

The reacting gases of the process, $UF_6$ and steam as in the known IDR process react together to give uranyl fluoride $UO_2F_2$ which is a precursor to $UO_2$ powder, a product widely used in the production of ceramic nuclear fuel pellets.

The product of the said plumes may be directed toward an outlet region of the reaction vessel. At such an outlet region $UO_2F_2$ may be removed and reacted with steam and/or hydrogen in a rotary kiln at higher temperatures than in the reaction vessel to produce $UO_2$ as in the prior art. The temperatures in the reaction vessel and in the rotary kiln may be similar to those employed in the prior art, viz from 150° C. to 250° C. in the vessel and from 500° C. to 800° C. in the kiln.

We have found that at least two plumes can be established in the IDR process by recirculating the $UO_2F_2$ particles produced at each plume such that seeding and growth of product particles can be successfully achieved.

Beneficially and unexpectedly, the $UO_2F_2$ product throughput can be increased in a simple and efficient manner whilst substantially maintaining the product quality.

Duel jet gas reaction arrangements are known in the prior art but for different purposes. For example, EP 54530 describes an arrangement in which $SiF_4$ is oxidised to $SiO_2$. In that case the fuel burns in a jet flame and the use of two jets controls the temperature of reaction. There is no circulation as in the present invention.

In the present invention, the plurality of plumes feeding input reactant gases into a circulating product formation stream contribute to the circulation process and product particle morphology. The particles formed by reaction of the reactant gases from each of the contributing plumes will promote seeding and growth of particles from the reactant gases from the other plume or plumes. The mutual geometrical arrangement of the plumes desirably promotes the circulation, mutual seeding and growth process. Desirably, the plumes point toward one another with an oblique angle between them. Desirably, one of the plumes is established above another plume, the said product outlet being substantially horizontally level with the lower plume.

BRIEF DESCRIPTION OF THE DRAWINGS

Embodiments of the present invention will now be described by way of example with reference to the accompanying drawings, in which.

Figure 1:
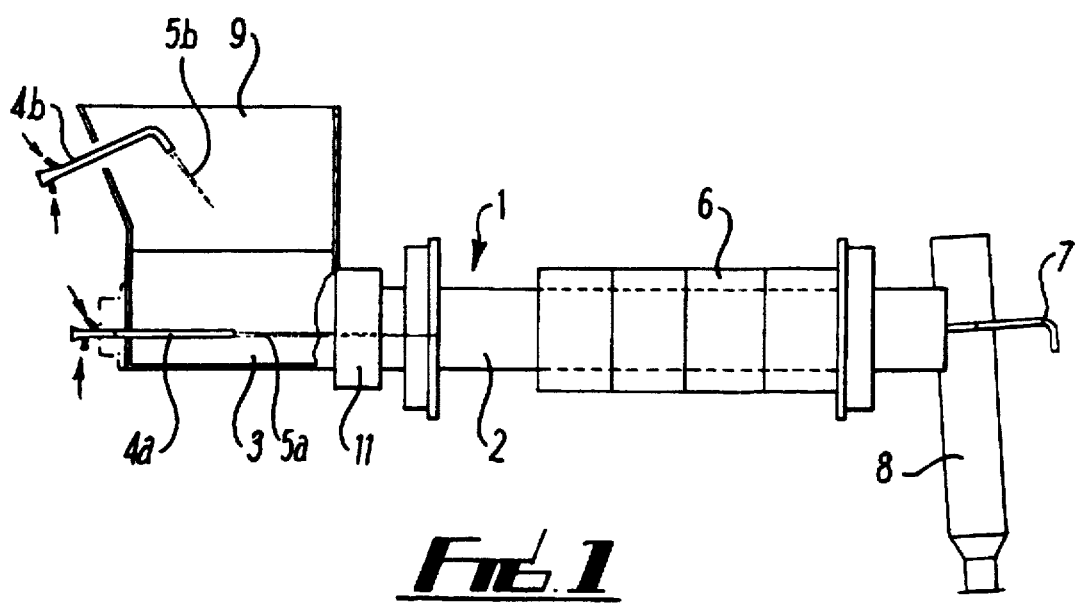
FIG. 1 is a diagrammatic side view of a multi-compartment apparatus for carrying out an improved IDR process for the conversion of uranium hexafluoride and steam into $UO_2$.

As shown in the drawings a two region vessel 1 comprises an inclined rotating barrel type kiln 2 having an inlet chamber 3 forming a first region of the vessel 1 into which uranium hexafluoride and dry steam are injected.

DETAILED DESCRIPTION OF THE INVENTION

The kiln 2 and chamber 3 are joined by a member 11 which provides an outlet region for products produced in the chamber 3 for delivery through the kiln 2.

Multiple co-axial jets (two shown in FIG. 1) 4a, 4b are fixed to project into the inlet chamber 3. $UF_6$ is delivered along the inner channel and dry steam is delivered along the outer channel of each jet 4a and 4b. Plumes 5a, 5b respectively are formed at the ends of the jets 4a, 4b inside the chamber 3 and point toward the outlet region (member 11). One of the jets 4a is provided substantially at the same level as the kiln 2. Another of the jets 4b is provided through the wall of a housing 9 or so-called disentrainment hopper above the chamber 3. The housing 9 forms an excess volume to permit recirculation of gases and particles contained therein to promote seeding and growth of the particles in the manner described above.

The jet 4b is bent so as to permit fitting of the jet through the wall of the housing 9 and also direction of the plume 5b formed by the jet 4b toward the outlet region (member 11).

Uranyl fluoride, $UO_2F_2$, produced in the inlet chamber 3 is converted to uranium oxide by a countercurrent flow of steam and/or hydrogen, entering the kiln 2 through an inlet 7. The uranium oxide is discharged through an outlet chamber 8.

Figure 2:
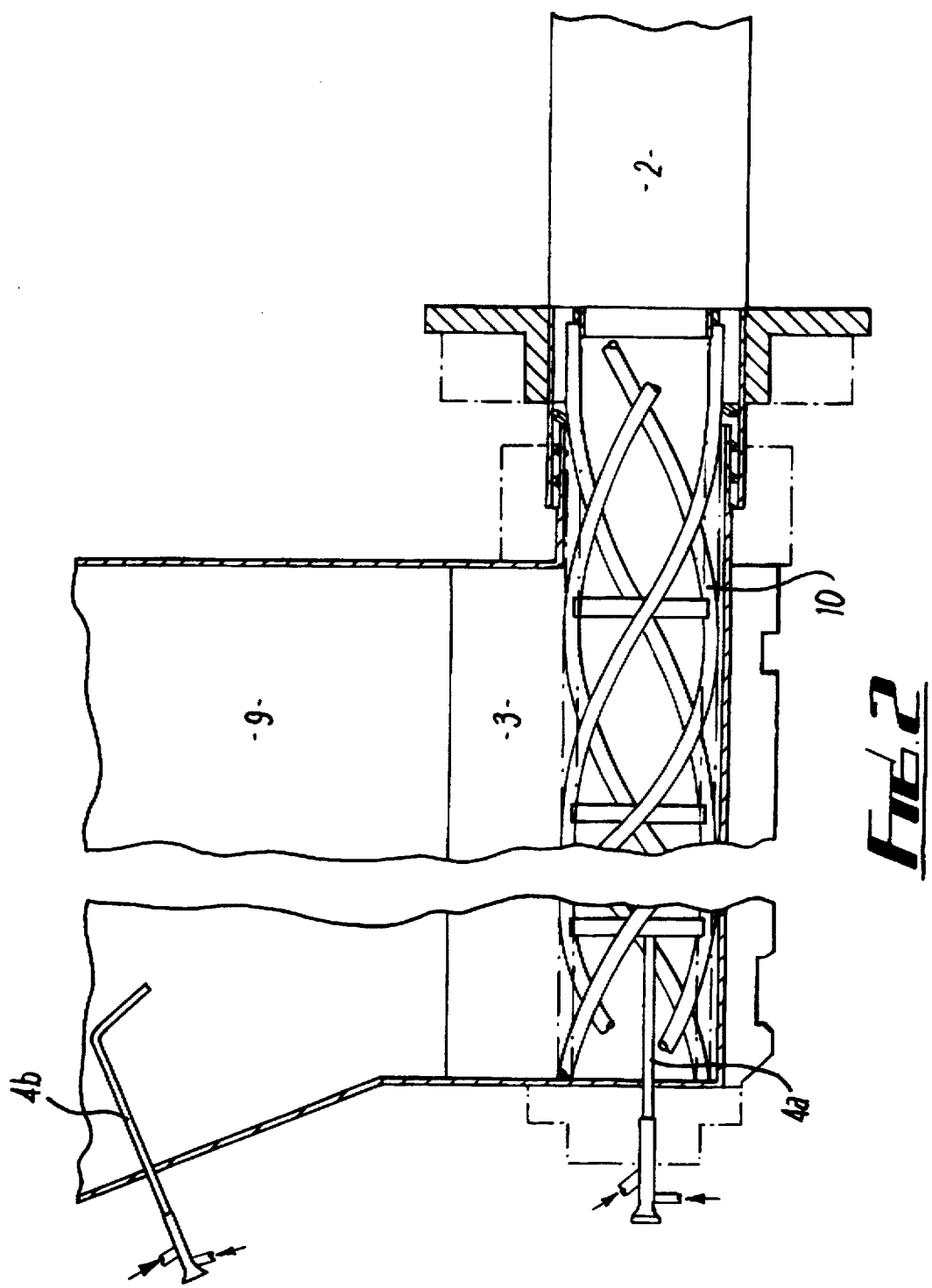
FIG. 2 is a partly sectioned view side view on a larger scale showing more detail of the apparatus shown in FIG. 1.

Filters (not shown) in the housing 9 above the inlet chamber 3 are provided to collect uranyl fluoride carried back into the chamber 3 by waste gases emerging from the upper end of the kiln 2 and the collected uranyl fluoride is dislodged by blow back facilities, falling through the plumes 5a and 5b of particles of uranyl fluoride to the bottom of the inlet chamber 3. There it is picked up by means provided for moving uranyl fluoride deposited in the inlet chamber 3 into the upper (inlet) end of the kiln 2 via the member 11. This means has been omitted from FIG. 1 but is illustrated in FIG. 2. Such means comprises a rotatable scroll member 10 disposed within the inlet chamber 3 which forms part of the means for transferring $UO_2F_2$ product particles formed in the inlet chamber 3 to the kiln 2. The scroll member 10 also assists together with the housing 9 in the process of recirculation of the $UO_2F_2$ product formation stream all in a single rotational sense so that the $UO_2F_2$ particles formed in the inlet chamber 2 pass through and around the plumes 5a and 5b to facilitate successful seeding and growth of product $UO_2F_2$ particles prior to the product particles being delivered to the kiln 2 for conversion into $UO_2$.

What is claimed is:

1. A process for oxidation of uranium hexafluoride by injecting the uranium fluoride and an oxidant gas together into a reaction vessel to form a plume, comprising providing a plurality of plumes that are formed together in a vessel, said plumes mutually contributing to a circulating product formation stream in said vessel, said plumes pointing towards one another with an oblique angle between them, whereby said process results in increased throughput without deterioration of said product.

2. A process as in claim 1 and wherein the product is a particulate solid which is initially formed as dendritic particles and then recirculated in the reaction vessel, the plumes contributing to the particle seeding and growth.

3. A process as in claim 2 and wherein a rotating mechanism is employed in the reaction vessel in which the plumes are formed to assist the recirculation process.

4. A process as in claim 1, and wherein the reaction vessel includes an enclosure providing a region of excess volume to facilitate recirculation.

5. A process as in claim 4 and wherein at least one of the said plumes is established in the said enclosure.

6. A process in any of the preceding claims and wherein at least one of the plumes is formed by combining a plurality of co-axial gas inlets in a multiple inlet jet.

7. A process as in any one of claims 1 to 5 and wherein at least one of the plumes is formed by combining a plurality of gas inlets which are side-by-side or one above the other in a multiple inlet jet.

8. A process as in any one of claims 1 to 5 and wherein the gases to be reacted comprise uranium hexafluoride and steam which react together to form particles of uranyl fluoride, $UO_2F_2$.

9. A process as in claim 8 and wherein the $UO_2F_2$ is delivered to a rotating kiln in which it is further oxidised to $UO_2$.

10. The process as set forth in claim 1 wherein there are at least first and second plumes and wherein said first plume is positioned above said second plume.

11. The process as set forth in claim 10 further comprising a product outlet positioned substantially horizontally level with said second plume.

* * * * *